United States Patent
Batchelor et al.

(10) Patent No.: US 6,492,572 B2
(45) Date of Patent: *Dec. 10, 2002

(54) METHOD FOR REMEDIATING CONTAMINATED SOILS

(75) Inventors: Bill Batchelor, Bryan, TX (US); Alison Marie Hapka, Arnold, MD (US); Godwin Joseph Igwe, Newark, DE (US); Richard Howard Jensen, Wilmington, DE (US); Michael F. McDevitt, Bear, DE (US); Dale S. Schultz, Hockessin, DE (US); Joyce May Whang, Wilmington, DE (US)

(73) Assignees: E. I. du Pont de Nemours and Company, Wilmington, DE (US); Texas A&M University Systems, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/799,435

(22) Filed: Mar. 5, 2001

(65) Prior Publication Data

US 2002/0156337 A1 Oct. 24, 2002

Related U.S. Application Data

(60) Division of application No. 09/062,351, filed on Apr. 17, 1998, now abandoned, which is a continuation-in-part of application No. 08/703,715, filed on Aug. 27, 1996, now Pat. No. 5,789,649.
(60) Provisional application No. 60/003,560, filed on Aug. 29, 1995.

(51) Int. Cl.$^7$ .............................. A62D 3/00; C09K 17/00
(52) U.S. Cl. ...................... 588/205; 588/206; 588/207; 588/252; 405/263
(58) Field of Search .................................. 588/206, 205, 588/209, 207, 252; 405/263; 210/749

(56) References Cited

U.S. PATENT DOCUMENTS

| | | | |
|---|---|---|---|
| 3,640,821 A | | 2/1972 | Sweeny et al. |
| 3,737,383 A | | 6/1973 | Jinnosuki Abe et al. |
| 4,209,335 A | * | 6/1980 | Katayama et al. ............ 106/89 |

(List continued on next page.)

FOREIGN PATENT DOCUMENTS

| | | | |
|---|---|---|---|
| CA | 2079282 | 3/1994 | |
| DE | 3810707 A1 | 10/1989 | |
| EP | 0012162 A1 | 6/1980 | |
| EP | 052600 | 4/1992 | |
| EP | 0502460 A2 | 9/1992 | |
| EP | 535758 A1 | * 4/1993 | ............ A62D/3/00 |
| EP | 0595441 B1 | 5/1994 | |
| GB | 2255087 A | 10/1992 | |
| WO | wo 9714656 | 4/1997 | |

OTHER PUBLICATIONS

NTIS: Chemical Dehalogenation Treatment Base–Catalyzed Decomposition Process (BCDP), Report No. PB93–182939, U.S. Naval Energy and Environmental Support Activity, Port Hueneme, CA, 1992, pp. 1–7.

Evans, et al., "Influence of Industrial Wastes on the Geotechnical Properties of Soil," Process of the 15th Mid–Atlantic Ind. Waste, pp. 557–568, No Date Given.

(List continued on next page.)

Primary Examiner—Stanley S. Silverman
Assistant Examiner—Eileen E. Nave

(57) ABSTRACT

A method is disclosed for the degradation of persistent contaminants in soil. The method provides the combination of a stabilizing reagent and a degradative reagent where both are admixed into a contaminated soil site for the reduction of permeability at the site and the chemical degradation of the contaminant over time.

36 Claims, 3 Drawing Sheets

U.S. PATENT DOCUMENTS

| | | | |
|---|---|---|---|
| 4,337,368 A | | 6/1982 | Pytlewski et al. |
| 4,351,718 A | | 9/1982 | Brunelle |
| 4,382,865 A | | 5/1983 | Sweeny |
| 4,400,552 A | | 8/1983 | Pytlewski et al. |
| 4,447,541 A | | 5/1984 | Peterson |
| 4,483,716 A | * | 11/1984 | Heller ............................ 137/7 |
| 4,601,817 A | | 7/1986 | Globus |
| 4,615,809 A | | 10/1986 | King |
| 4,747,937 A | * | 5/1988 | Hilfman et al. ......... 208/251 R |
| 4,776,409 A | * | 10/1988 | Manchak, Jr. ............... 175/50 |
| 4,842,448 A | | 6/1989 | Koerner et al. |
| 4,844,839 A | * | 7/1989 | Manchak, Jr. .............. 252/633 |
| 4,855,083 A | | 8/1989 | Kagawa et al. |
| 5,064,526 A | | 11/1991 | Rogers et al. |
| 5,114,497 A | | 5/1992 | Johnson et al. |
| 5,197,823 A | | 3/1993 | Cutshall et al. |
| 5,234,485 A | * | 8/1993 | Bolsing .......................... 71/27 |
| 5,266,213 A | | 11/1993 | Gillham |
| 5,347,077 A | * | 9/1994 | Hooykaas et al. .......... 588/257 |
| 5,413,616 A | * | 5/1995 | Bolsing .......................... 71/27 |
| 5,431,823 A | | 7/1995 | Gofer |
| 5,480,524 A | * | 1/1996 | Oeste ...................... 204/158.2 |
| 5,591,116 A | | 1/1997 | Pierce |
| 5,616,253 A | | 4/1997 | Fernando et al. |
| 5,618,427 A | | 4/1997 | Seech et al. |
| 5,676,845 A | * | 10/1997 | Derleth et al. ............... 210/757 |
| 5,689,798 A | * | 11/1997 | Oeste .......................... 422/168 |
| 5,789,649 A | * | 8/1998 | Batchelor et al. ............ 588/206 |
| 5,931,773 A | * | 8/1999 | Pisani .......................... 588/256 |
| 6,083,394 A | | 7/2000 | Seech et al. |
| 6,207,073 B1 | * | 3/2001 | Wolfe et al. ................. 252/175 |

OTHER PUBLICATIONS

EPA Method 8260 (USEPA SW 834, Method No. 8260), Gas Chromatography/Mass Spectrometry for Volatile Organics, Capillary Column Technique, Revision 0, Dec. 1987, Purge and Trap Cleanup, pp. 1–52.

Vogel, T., et al., Environ. Sci.Technol. 21, 722 (1987).

Biswas, N., et al., Water Environ. Res. 64, 170, 10, 1 (1992).

Hutter, G.M., et al., Water Environ. Res. 64, 69 (1992).

Metheson, et al., Environ. Sci. Technol., 28, 2045 (1994).

Degani, R., Chemical and Engineering News, 21, Jun. 24, 1991.

Butler, et al., J Environ Sci Health Part B Pestic Food Contam Agric Wastes, 16, 95 (1998).

* cited by examiner

METHOD FOR REMEDIATING CONTAMINATED SOILS

This application is a divisional of U.S. application Ser. No. 09/062,351, filed on Apr. 17, 1998 (now abandoned), which is a continuation-in-part of U.S. application Ser. No. 08/703,715, filed on Aug. 27, 1996 (now U.S. Pat. No. 5,789,649), which claims the benefit of U.S. Provisional Application No. 60/003,560, filed on Aug. 29, 1995.

FIELD OF INVENTION

The present invention relates to the field of environmental remediation and 5 specifically to the remediation of pollutants in contaminated soil. More specifically the instant invention provides a method for the remediation of toxic compounds from soil whereby the contaminated soil is stabilized in the presence of a pollutant degradative agent.

BACKGROUND

Soil and groundwater pollution is a worldwide problem associated primarily with government and industrial sites where mishandling or improper disposal of chemicals has brought a variety of pollutants in contact with the soil. Common pollutants include hydrocarbons, heavy metals, and halogenated volatile organic solvents such as tetra-, tri-, or di- chloroethylene, carbon tetrachloride, chloroform and methylene chloride. The toxicology of many organic solvents suggests that these compounds may be carcinogenic and damaging to specific organs such as the liver and kidneys (Price, P. S., Memo of the U.S. Environmental Protection Agency, Office of Water, Washington, D.C. (1985); Vogel, T. Ni, *Environ. Sci. Technol.* 21, 722, (1987).

Many of the most troublesome solvents fall into the category of dense non-aqueous phase liquids (DNAPLs). The remediation of DNAPLs is problematic since, their high density and low water solubility cause them to sink through the soil and water thereby contaminating successive levels, and follow topographic lows within an aquifer system often accumulating atop the underlying clay stratum. Further, since most are sparingly soluble in water they are adsorbed on to soil particles producing tenacious underground plumes of dissolved organic which cannot be readily and permanently removed by standard pump and treat technology (Biswas,. N., et al., *Water Environ. Res.* 64,170,10,1(992); Hutter, G. M., et al., *Water Environ. Res.* 64, 69, (1992)).

Current methods for remediation of DNAPLs include excavation, slurry walls, cutoff trenches, in-situ biodegradation and pump and treat. Because of the pervasive nature of DNAPL contamination a common approach to remediation has been to treat the DNAPL contaminated groundwater plume as opposed to addressing the source of contamination. One successful method for groundwater plume treatment involves the use of zero valent metals. For example, Matheson et al., (*Environ. Sci. Technol.,* 28, 2045, (1994)) disclose a method for the reduction of chlorinated solvents by fine-grained iron metal in a well-mixed anaerobic batch system. Similarly R. Gillham (U.S. Pat. No. 5,266,213) teaches a method for the decontamination of chlorinated solvents from a groundwater plume where the contaminated groundwater is fed through a trench containing iron filings under strict exclusion of oxygen and under highly reducing conditions. Finally, Sweeny et al., (U.S. Pat. No. 3,640,821) teach that halogenated organic pesticides, typified by DDT, chlordane, lindane and the like that are typically near the surface and strongly absorbed on soils, may be degraded by reacting them with metallic zinc under mildly acid conditions (U.S. Pat. No. 3,640,82 1) or by metallic couples such as iron and copper (U.S. Pat. No. 3,737,384).

The above methods are useful for the treatment of dissolved groundwater plumes but do not address how the source of DNAPL contamination may be remediated in-situ.

Methods of treating soil contamination with elemental metals are known. For example, Cutshall et al., (U.S. Pat. No. 5,197,823) discloses a method for treating polychlorinated biphenyl (PCB) contaminated soils by adding an effective amount of elemental zinc powder to moistened soil. In similar fashion Butler et al., (*J Environ Sci Health Part B Pestic Food ContamAgric Wastes* 16, 95, (1998)) disclose the reductive dechlorination of dieldrin and endrin in soil samples containing powdered zinc metal in combination with acetic acid and acetone to facilitate the reaction.

These methods of treating soils are useful, but cannot be applied to DNAPL source treatment. An effective method of deactivating the source of DNAPL contamination is by reducing the permeability of the contaminated region to water flow. This is typically done through the use of stabilizing agents. Stabilizing reagents can be selected or designed to greatly reduce the permeability of the soil, thereby diverting groundwater around a contaminated area, thereby preventing fin-ther leaching into the groundwater. Stabilizing agents also function to a reduce the hazard of a waste by binding and converting the contaminants into a less soluble, less mobile or less toxic forms. Typical stabilization reagents include Portland cement, metal oxides, clays, natural materials (peat moss, natural zeolites, vermiculite, etc.), synthetic materials (zeolites, fly ash, organic polymers, etc.), and activated carbon. (Conner, J. R., *Chemical Fixation and Solidification of Hazardous Wastes,* Van Nostrand Reinhold, II 5 Fifth Avenue, New York, N.Y., 10003, (1990)).

Although stabilization technologies are now widely used for treatment of hazardous waste sludge, power plant residues, municipal ashes, nuclear wastes, and contaminated soils, these processes have shortcomings for organic contaminants, including the difficulty in demonstrating the long-term stability of the treated waste and the fact that the contaminants are not destroyed or degraded.

The problem to be overcome therefore is to develop a method that will chemically attack the source organic DNAPL's in the soil and effectively prevent the contaminant from migrating in the groundwater. Applicants have solved this problem by developing a method that combines the use of stabilization technology to reduce water permeability at the contamination source and a degradative agent that facilitates the destruction of the organic contaminant in its stabilized form. Although both elements of this method have been practiced separately, applicants are the first to teach how to combine the two technologies such that the two are operable in concert. Applicant's method reduces the permeability at the contamination source by adding/mixing a stabilizing agent such as cement, bentonite clay or iron chloride with a degradative agent. such as elemental iron, 10 metal couples or a base catalyzing decomposition agent. Introduction of the combined stabilizing agent/degradative agent into a contaminated area results in the diverting of the majority of groundwater flow around the source volume (thus preventing leaching into the groundwater) while at the same time binding and destroying the contaminant.

SUMMARY OF THE INVENTION

The present invention concerns a process for the chemical degradation and stabilization of chemical pollutants at a contamination source in a soil contaminated with pollutants comprising admixing with the soil at said contamination source an effective amount of degradative reagent and a suitable stabilizing agent to form a stabilized degradative reagent such that said admixing results in the reduction of permeability at said contamination source, diversion of groundwater around the contamination source, and the degradation of said pollutant over time. Further provided is a process for the metal initiated chemical degradation of halogenated organic compounds from soil contaminated with halogenated organic compounds comprising admixing with said contaminated sod an effective amount of a metallic couple comprising a reductive zero valent metal and a metal catalyst, an effective amount of ferrous iron and alkaline buffer, or an effective amount of an alkali metal sulfide or polysulfide, wherein said metallic couple, buffered ferrous iron, or sulfide dehalogenates said halogenated organic compounds to lower the concentration of said halogenated organic compounds in soil.

BRIEF DESCRIPTION OF THE FIGURES

FIG. 2 is an illustration of the remediation of a contaminated sit using a mixing means to add a stablized degradative regent to a contamination source. While FIG. 2 depicts an auger being used as this mixing means, other mixing means well known in the art, including jet grouting and even a back hoe for shallow contamination sites, can be substituted.

DETAILED DESCRIPTION OF THE INVENTION

Figure 1:
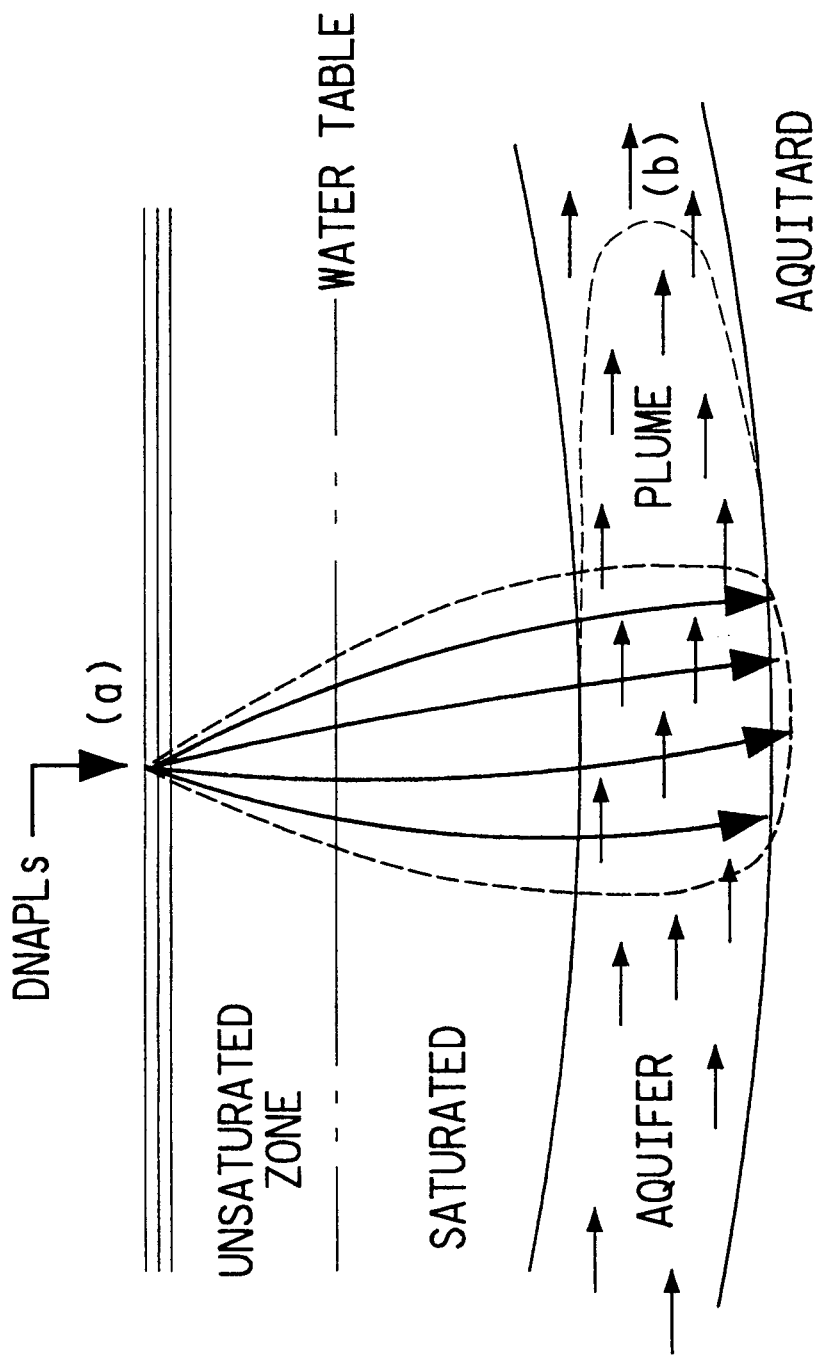
FIG. 1 is an illustration of a DNAPL contaminated site showing the flow of the pollutant through the soil and into the aquifer.

As used herein the following terms may be used for interpretation of the claims and specification.

The term "degradative agent" will refer to any agent that will effect the chemical degradation of the contaminant of interest. Degradative reagents include but are not limited to zero valent metals, metal couples as defined below and sulfides as defined below.

The term "metal initiated chemical degradation" refers to the degradation of halogenated organic compounds by chemical means involving the reductive dehalogenation of the compound in the presence of a reductive, zero valent metal. Optionally the chemical degradation may take place additionally in the presence of a metallic catalyst.

The term "contaminant" or "pollutant" or "organic contaminant" will refer to toxic chemical species. Typical contaminants will include those chemical species that are persistent in the environment and are known to be toxic to humans and wildlife such as halogenated organics and hydrocarbons.

The term "contamination source" will refer to a high concentration of pollutant or contaminant in soil, such as occurs in the region of a release or spill. The term "contamination plume" will refer to a concentration of pollutant or contaminant that has leached from a contamination source and has entered the groundwater aquifer.

The term "halogenated organic compounds" will refer to halogenated pollutants commonly found in soil and groundwater. Typical halogenated organics remediated by the present invention will be chlorinated solvents such as carbon tetrachloride (CC14), tetrachlorethylene or perchlorethylene (PCE), trichloroethylene (TCE), and chlorinated benzenes.

The term "contaminated soil" or "contaminated site" will refer to any soil or any site containing soil, either at ground level or subsurface that contains unacceptable levels of contaminants or pollutants.

The term "zero valent metal" will refer to any metal in its elemental state capable of reducing halogenated organic compounds. Typical zero valent metals suitable in the present invention are iron and zinc. The terms "metallic couple" and "metal couple" will refer to the combination of a reductive metal such as zero valent metal and a metal catalyst such as nickel or copper, or combinations of ferrous and ferric iron, in a ratio so as to be effective in the degradation of halogenated organic compounds.

The term or symbol "Fe/Cu" will refer to the metallic couple of iron and copper.

The term or symbol "Fe/Pd" will refer to the metallic couple of iron and palladium.

The term "stabilized degradative reagent" refers to a reagent comprising a stabilizing agent and a degradative agent in concentrations and under conditions whereby the reagent will effectively degrade contaminants of interest.

The terms "stabilizer" and "stabilizing agent" are used to describe additives that, by primarily a physical process, act as permeability reducing agents that decrease the permeability of the soil to groundwater.

The term "catalyst" is used to describe metals such as palladium that are well known to provide a catalytic function in hydrogenation reactions and also metals such as copper that enable such reactions but for which true catalytic activity may not have been established.

The term "alkaline buffer" will refer to an aqueous solution or slurry of an alkali metal hydroxide, alkaline earth metal hydroxide, or mixtures of alkaline materials such as Portland cement.

The term "sulfide" will refer to alkali metal sulfides and polysulfides.

The instant invention provides a method for the chemical degradation of pollutants, and particularly organic pollutants from soil at the source of the contamination. The present method uses a combination of a stabilizing agent and a degradative agent to decrease permeability at the contaminated source while at the same time degrading the contaminant.

In one embodiment the invention uses zero valent metal particles in combination with a metallic catalyst as the degradative agent where the metal couple is either admixed into the soil or combined with a stabilizing reagent. The combination of metallic couple and stabilizing agent is particularly effective for the destruction of halogenated organics such as chlorinated organic solvents. The combination of the metallic couple with the stabilizing agent has the effect of reducing the permeability of the soil to groundwater flow and prevents the halogenated organic contaminant from being drawn into the aquifer and forming a contamination plume.

The instant method is useful for the remediation of organic contaminants, and particularly chlorinated organic compounds that are persistent in the environment and pose a health risk to humans and wildlife. The method may be used in situ and eliminates the need for expensive and hazardous handling of contaminated water required by standard pump and treat methods. The instant method may be used for the remediation of industrial sites as well as for the decontamination of waste dumps.

Compounds Degraded

Compounds that are susceptible to degradation by the instant method are those that will serve as substrates for various suitable degradative agents. It is contemplated that the present method will be effective in degrading halogenated organic solvents (chloroform, trichloroethylene (TCE), tetrachloroethylene or perchloroethylene (PCE), methylene chloride, polychlorinated biphenyls (PCBs), carbon tetrachloride and chlorinated benzenes). Compounds shown to be particularly susceptible to the instant methods are straight chain chlorinated organic solvents such as trichloroethylene, tetrachlorethylene, carbon tetrachloride, and chlorinated benzenes such as chlorobenzene and o-dichloro-benzene.

Degradative Agents

The present invention provides a variety of degradative agents that may be used in combination with a stabilizing reagent. Suitable degradative agents fall into five categories comprising either metal couples such as iron/copper or iron/palladium, metal on carbon (Pt/C, Pd/C Rh/C), ferrous iron, sulfides, and alkaline reagents useful in base catalyzed degradation of pollutants.

Metallic Couples

In a preferred embodiment the present invention utilizes a metallic couple as a degrading reagent to treat soil contaminated with halogenated organic compounds. Typically one of the metallic components is a zero valent metal and the other component is a metallic catalyst. Zero valent metals useful in the present invention include but are not limited to iron, zinc, aluminum, cadmium, and magnesium.

Although metallic couples have been used for the remediation of halogenated organics in groundwater, little or nothing is known about the application of zero-valent metals, such as iron or zinc or copper in soils contaminated with high concentrations of volatile organic compounds typical of spill areas. Uncertainty in how metallic couples will respond in spill areas lies in a number of factors. For example, problems associated with controlling the pH of the degradative process and the deactivation of the metal surface make the practical application of this technique difficult and the result uncertain. One model for reductive dehalogenation by iron involves hydrogen evolution as a product of corrosion with water. Iron will reduce a chlorinated organic according to the following reaction (1):

$$Fe^0 + RX + H_2O \rightarrow Fe^{+2} + RH + X^{31} + OH^- \quad (1)$$

Hydrogen will evolve according to (2) as follows:

$$Fe^0 + 2H^+ \rightarrow Fe^{+2} + H_2 \quad (2)$$

Reductive dehalogenation is then able to proceed acceding to reaction (3) in the presence of a catalyst such as copper or palladium:

$$H_2 + RX \xrightarrow[\text{Cu or Pd}]{\text{catalyst}} RH + H^+ X^- \quad (3)$$

In the absence of an effective catalyst, $H_2$ is not a facile reductant, and this reaction will not contribute directly to dehalogenation. Excessive $H_2$ accumulation at the metal surface is known to inhibit the continuation of corrosion and of reduction reactions in organic synthesis (Degani, R., *Chemical and Engineering News*, 2 1, Jun. 24, 1991). Rapid dehalogenation by H2 is still possible, however, if an effective catalyst is available (Degani, supra ). The surface of iron, its defects, or other solid phases present in the system could provide this catalyst. For the purposes of the present invention iron was selected as the preferred metal due to its low cost, low toxicity, and availability, and copper and palladium were selected as the preferred catalysts. The net reaction describing the dehalogenation of organics, such as carbon tetrachloride by a metal or metallic couple is as follows:

$$CCl_4 + 4H_2O + 4Fe^0 \rightarrow CH_4 + 4Cl^- + 4OH^- + 4Fe^{+2} \quad (4)$$

The stoichiometric ratio of iron to carbon tetrachloride is calculated as follows:

4 mole Fe/mole $CCl_4$×mole $CCl_4$/153.812 g $CCl_4$×55.847 g Fe/mole Fe=1.45 g Fe/g $CCl_4$ Thus, stoichiometxy requires 1.45 grams of iron for each grain of carbon tetrachloride. In order to provide adequate driving force for the reaction, more than the stoichiometric requirement of iron should be used initially.

It will be appreciated that this ratio is calculated for pure carbon tetrachloride. The amount of iron needed to treat a ton of soil contaminated by carbon tetrachloride will depend on the concentration of carbon tetrachloride in the soil. Table I below lists a range of carbon tetrachloride concentrations (in soil) and minimum amounts of iron that would be needed to treat them.

TABLE I

| | Range of Treatment Options | | | |
|---|---|---|---|---|
| % CC14 in soil | in soil (mg/kg) | g CC14 per ton | g Fe needed | lb Fe per ton of soil |
| 5.0% | 50,000 | 45,400 | 65,909 | 145 |
| 3.0% | 30,000 | 27,240 | 39,545 | 87 |
| 1.0% | 10,000 | 9,080 | 13,182 | 29 |
| 0.5% | 5,000 | 4,540 | 6,591 | 15 |
| 0.1% | 1,000 | 908 | 1,318 | 3 |

Table I lists minimum quantities of iron needed for treatment based on. theoretical considerations. As a practical matter, use of an excess quantity of iron for in situ remediation of a contaminated site is preferred for a number of reasons. For example, iron may participate in other reactions and therefore become unavailable for reaction with carbon tetrachloride. Further, an excess of iron drives the reaction to completion in time.

Although Fe/Cu and Fe/Pd metallic couples are preferred it will be appreciated that couples comprising one or more catalytic metals with two or more reductive metals will also be effective. It is further contemplated that the present invention may be practiced using only the reductive metal without the catalyst. Examples of metallic couples expected to be effective in the reaction include zinc-copper, zinc-silver, iron-copper, iron-palladium, aluminum-copper, magnesium-copper, cadmium-copper and zinc-iron-copper, where iron-copper and iron-palladium are the most preferred.

Metallic couples may be used in a ratio of about 99.9% reductive metal to 0.1% catalytic metal where a ratio of about 90-95% reductive metal to about 10-5% catalytic metal is preferred for low cost catalysts. For higher cost catalysts, such as palladium, 0.05% or less catalyst on iron may be sufficient.

Although a highly effective use of the metallic couple is in combination with a suitable stabilizing agent, it is understood that the metallic couple will function as degradative agents in soil alone, even at high organic concentrations.

This is a surprising finding since heretofore the only use of metallic couple for the reductive dehalogenation of organic solvents has been in groundwater. This is primarily because, as mentioned above, problems associated with controlling the pH of the process and the deactivation of the metal surface make it difficult to predict if the technique will be effective in the remediation of high concentrations of halogenated organics.

Ferrous Iron

In another embodiment the present invention utilizes a degrading reagent comprising ferrous iron and an alkaline buffer to treat soil contaminated with halogenated organic compounds. An example is a solution or slurry of ferrous sulfate and calcium hydroxide or ferrous sulfate and Portland cement. The amount of calcium hydroxide is an amount sufficient to provide a solution or slurry pH of about 10–12 and typically a molar ratio of Ca:Fe of at least 1.0.

By analogy with the above discussion on metallic couples and Equation 4, one model for reductive dehalogenation by ferrous iron is shown by Equation 5:

$$8Fe^{2+}+CCl_4+4H_2O \longrightarrow 8Fe^{3+}+4Cl^-+4OH^-+CH_4 \qquad (5)$$

The stoichiometric ratio of iron to carbon tetrachloride is calculated as follows:

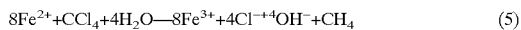

8×AW Fe/MW CCl₄=8×55.847/153.812=2.90 g Fe/g CCl4

As before, to provide adequate driving force for the reaction, more than the 15 stoichiometric requirement of iron should be used initially.

Sulfides

In another embodiment the present invention utilizes a degrading reagent comprising an alkali metal sulfide or polysulfide ("sulfide") to treat soil contaminated with halogenated organic compounds. Such sulfides are also believed to act as electron donors and degrade the halogenated compound by reductive dechlorination. Additionally, the use of sulfides would simultaneously provide a means to inunobilize toxic metals, such as lead, contaminating the site. An example of a sulfide is a solution or slurry of sodium polysulfide, prepared by mixing one molar proportion of sodium sulfide with about two molar proportions of elemental sulfur. The amount of sulfide is an amount sufficient to provide a molar ratio of S:halogen of at least 1:1.

Again, to provide adequate driving force for the reaction, more than the minimum requirement of sulfide should be used initially.

Base Catalyzed DegEadative Agents

In another embodiment it is contemplated that various agents capable of fostering base catalyzed degradation of pollutants may also be used as a degradative agent. It is known for example that base catalyzed degradation is effective for the degradation of compounds such as polychlorinated biphenyls (PCBs), pentachlorophenol (PCP), lindane, and chlorinated dibenzodioxins and furans (Report (I 992), Order No. PB93-182939, 7 pp. Avail.: NTIS From: Gov. Rep. Announce. Index (U.S.) 1993, 93(15), Abstr. No. 344,810). Alkaline agents particularly useful in such process include alkali or alkaline earth metal carbonate, bicarbonate, or hydroxide (U.S. Pat. No. 5,064,526).

Stabilization and Peduction of Pepmeability

In one embodiment of the invention a suitable soil stabilizing reagent is mixed at an effective concentration with degradative agent that is then mixed into contaminated soil for the combined effect of reducing soil permeability and organic contaminant degradation. A variety of stabilizing reagents is known and contemplated to be useful in the instant invention. Typical stabilizing agents may include but are not limited to Portland cement, soluble silicates-cement, pozzolan-lime, pozzolan-cement, clay cement, clays such as bentonite, iron chloride mixtures, and fly ash.

Stabilizers such as Bentonite, Kaolinite, and Portland Cement

Bentonite clay, for instance, is a high swelling, sodium montinorillonitic clay mineral, which, because of its mineralogical structure, has the capability of taking water between the structural sheets. Sodium montinorillonite is ideally composed of two sheets of silica tetrahedron on either side of an octahedral gibbsite sheet. Isomorphous substitution within the layers of the sheet result in charge deficiencies. Cations may be present between the layers to balance the charge deficiencies. These interlayer bonds are therefore relatively weak and easily separated by imposed stresses such as the adsorption of water or other polar liquids. Hence, montmorillonitic clays may swell to approximately 200 times their original volume (Evans, et al., "Muence of Industrial Wastes on the Geotechnical Properties of Soils." *Proc. of the 15th Mid-Atlantic Ind. Waste Conf.*, Bucknell University, Bethlehem, Pa. (1983)). Kaolinite clay (available from Thiele Co., St. Louis Mo.) is also a preferred stabilizer. This characteristic makes these materials useful in civil engineering applications such as soil-bentonite slurry trench cutoff wAs. However, the reversibility of such swelling also subjects these materials to the potential for chemical "incompatibility" with the contaminated groundwater or waste fluids. Although much has been published regarding investigations of clay liner-waste interaction, little information is presently available regarding soil-bentonite-waste. interactions, and nothing is previously published on the interaction of clay with metal dehalogenation.

It is one object of the present invention to mix such clay powders or Portland cement into contaminated soil in the presence of a degradative agent to decrease the permeability (saturated hydraulic conductivity), divert groundwater away from the contamination, and ensure destruction of a contaminated zone by entrapping and immobilizing the contaminant source. By immobilization of the contaminants source in the affected aquifer region through sealing and entombing them in a monolith of clay or reaction products of Portland cement, an impermeable container is created to surround and isolate the contaminated region for reaction with the degradative reagents described above. Portland cement acts as both a stabilizer and an alkaline buffer.

Metal Solutions Stabilizers and Grouts

One stabilizing or grouting system of particular interest is a metal solution mixture designed to precipitate solid phase metal compounds over time into a soil-contaminated area. Precipitation of the metal phase effectively reduces soil permeability and hydraulic conductivity. This system comprises a metal solution such as iron chloride at an initially acid pH, in combination with an enzyme and suitable enzyme substrate, such as urease and urea. Additionally, the mixture may contain a chelating agent such as citric acid that functions to raise the pH level at which the metal will precipitate from solution. The enzyme and enzyme substrate are chosen so as to slowly increase the pH of the metal solution over time and thus effect the gradual precipitation of the metal from solution.

By way of explanation, the metal solution may be mixed with a chelator and an alkaline agent at a time significantly in advance of when the solution will be introduced to an area to be treated. Preferably, the enzyme should be added to the solution within about I to 48 hours prior to introduction into the contaminated soil since substantial precipitation will occur in this time period.

The metal solution of this invention typically has a metal concentration in the range of about 0.1% to 10% by weight metal salt. Preferably the range will be about 1% to 7% metal by weight. Typical metals include ferric chloride, ferrous chloride, and ferrous sulfate.

The exact conditions needed for a solution of this invention (e.g., amount of chelating agent and alkaline agent) will depend on the initial pH, and the desired amount and type of metal salt present. For iron solutions, the solubility of the iron is very dependent on the pH of the solution, and on the redox potential of the iron. At very low pH's (O to 2), iron is in the form of either $Fe^{3+}$ or $Fe^{2+}$ At pH of about 2, the $Fe^{3'}$ becomes $Fe(Oli)_3$. Then at a pH of about 8, $Fe^{2+}$ becomes $Fe(OH)_2$.

Various methods can be used to place the metal solution into the soil to be treated. Typical methods include jet grouting, permeation grouting or deep soil mixing. The preferred method will depend on the particular application. Where chemical grouting is needed to establish physical barriers or waus, and even floors, to contain hazardous waste, jet grouting is a useful method. For more information on these methods see Reuban Karol, *Chemical Grouting* 2d edition, Marcel Dekker, Inc., New York (I 990).

Mixing Degradative and Stabalizing Reagents

Typically degradative and stabilizing reagents will be mixed into the soil simultaneously in appropriate concentrations and condition to allow for the degradation of the contaminant or pollutant of interest.

When using clays or powders the concentration of clay in the soil may range from 1% to about 10% where a range of 5% to 8% is preferred. Similarly if metallic couples such as Fe/Cu are used it is preferred if the metallic couple is present in the soil at a concentration of about 1% to 10% where a range of 2% to 5% is most preferred. But the amount of metallic reactant is dependent on the amount of organic contaminant to be destroyed.

It is understood that the present method will operate at a wide range of temperatures rangin from 0° C. to 100° C. where ambient temperature is preferred.

One of the advantages of the present invention is that it is not necessary to pre-treat contaminated site with various reagents to maintain desirable pH levels. The present method is operable at pHs in the range of 2.0 to IO. 0 where a pH of 7.0 is preferred.

Figure 2:
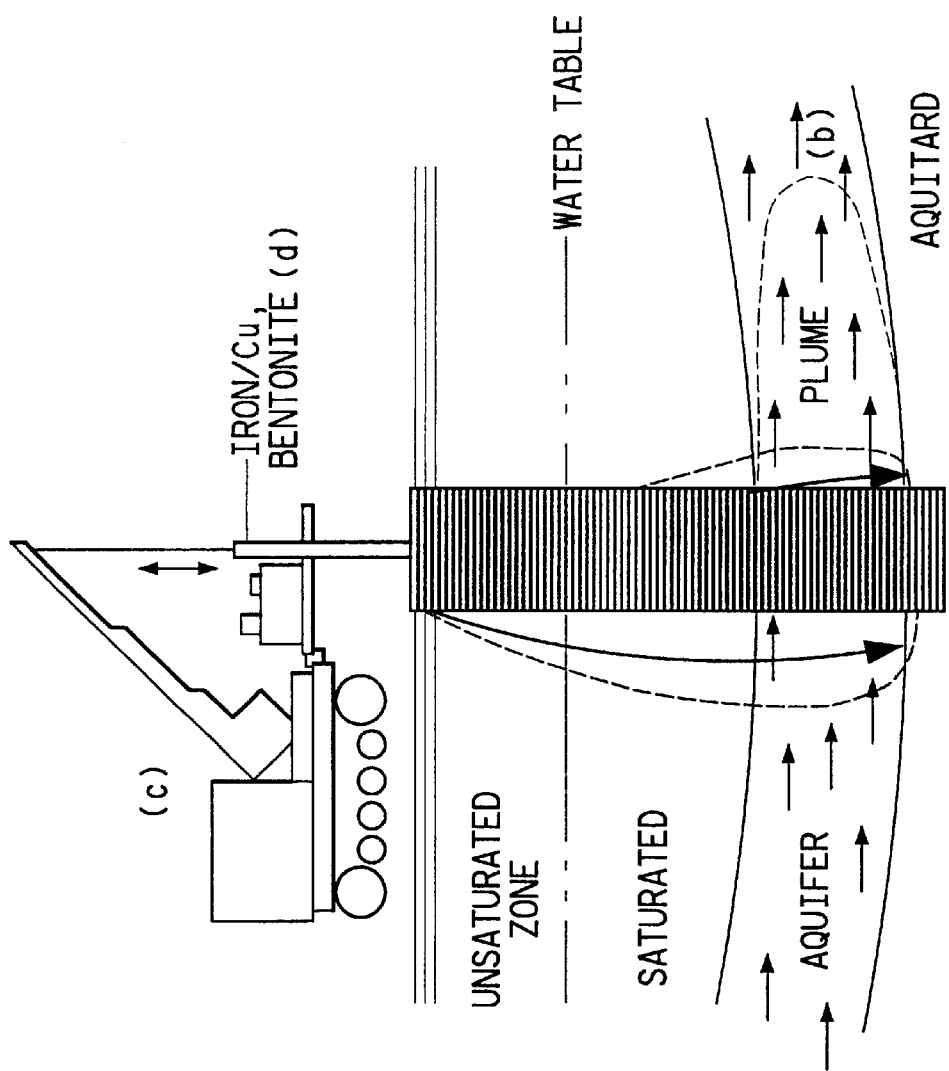
Figure 3:
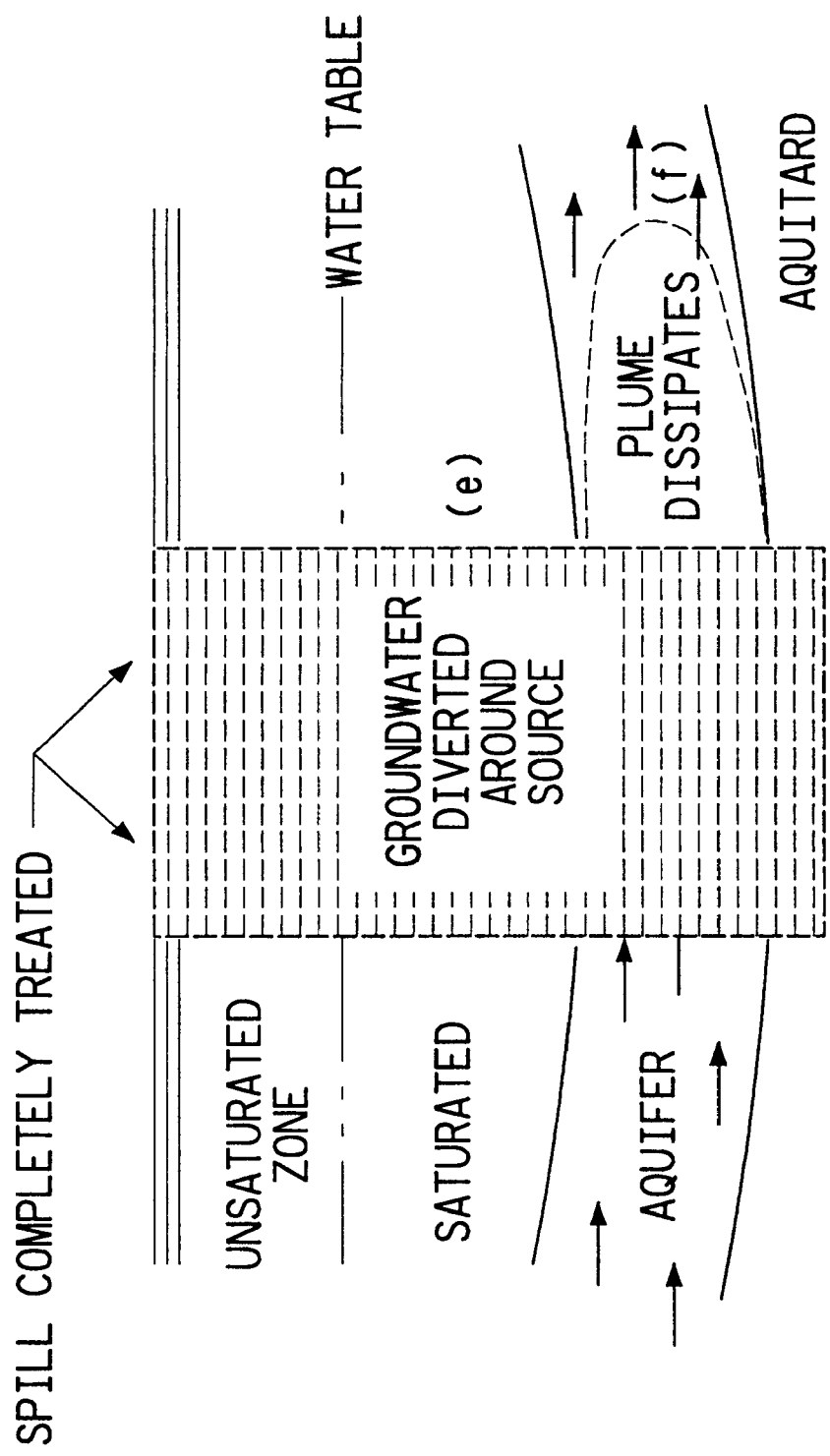
FIG. 3 is an illustration of a contaminated site post treatment by the method of the present invention.

In one embodiment soil, contaminated with a halogenated organic, may be remediated in situ at the source of contamination by admixing a suitable amount of stabilized degradative reagent into the soil at the affected area. FIGS. 1–3 illustrate how such a process would be accomplished.

Typically a source of contamination (FIG. 1 (a)) is identified. Examples of typical contaminants are of dense non-aqueous phase liquids (DNAPLS) which may comprise halogenated organics and other persistent contaminants.

If left untreated contaminants diff-use from the source (FIG. 1 (a)) enter the groundwater aquifer forming a dissolved groundwater plume (FIG. 1 (b)). The present method provides a mixing means (FIG. 2(c)) which is capable of reaching the source from the surface. Examples of suitable mixing means will include jet grouting, auguring machinery and similar devices such as those used by Geo-Con. Inc., Pittsburgh PA and others. Using the mixing means, an effective amount of stabilized degradative agent, such as Bentonite and Fe/Cu metallic couple (FIG. 2(d)) is admixed into the contaminated source.

When using metallic couples as the degradative agent it is preferred if the amount of reductive metal is added at a molar excess with respect to the concentration of halogenated organic contaminant. The remediation reaction will proceed at ambient temperature and pH but it is preferred that the temperature be at least 18° C. and that the pH be adjusted to between 2.0 and 10.0. Although it is not necessary for the reaction conditions to be completely anaerobic, the action of the reductive metal will be enhanced if oxygen is eliminated from the remediation site.

If the principle contaminant is, for instance, carbon tetrachloride it is anticipated that partial reaction products will include chloroform, methylene chloride, and methyl chloroform as well methane, carbon dioxide, formaldehyde and hydrochloric acid. Contaminant degradation products may be monitored by any means known in the art as for example by gas chromatography in combination with a mass spectrometer.

The admixing of the stabilized reductive reagent into the soil has the effect of reducing the permeability of the contamination source significantly. A permeability reduction of between one and 4 orders of magnitude are expected. Reduction of the soil permeability effectively excludes the groundwater from entering the contamination source and sequesters the organic contaminant. Thus the reduction in permeability combined with the oxidative action of the metallic couple serves to prevent the contaminant from entering the aquifer while, at the same time, degrading the toxic solvent.

After the stabilized reductive reagent has been effectively mixed into the contamination source the permeability has been so reduced as to divert ground water around the source (FIG. 3(e)) and causes the dissipation of the contamination plume (FIG. 3(f)). Over time the presence of the degradative agent in the stabilized degradative reagent reduces the concentration of the stabilized contaminants and prevents further leaching into the environment.

EXAMPLES

Materials and Methods

The composition of the metallic couple/metal used in the following examples was in the range of iron (99.9%)/Cu (.1%) to iron (98%)/Cu (2%) for the Fe/Cu couples, iron (99.95%)/Pd(0.05%), or iron(100%) by weight. Soil used in the following examples was standard Trevino soil, analyzed by A & L Eastern Agricultural Laboratories, Inc., Richmond, Va., and having the following properties:

| | |
|---|---|
| Soil pH | 8.2 |
| Cation Exchange capacity (meq/1 00 g) | 14.6 |
| Percent Sand | 50 |
| Percent Silt | 45 |
| Percent Clay | 5 |
| Textural classification | Sandy Loam |

Carbon tetrachloride used as a sample contaminant was obtained from Sigma Chemical Company (St. Louis, Mo.) and had the following specifications:

| | |
|---|---|
| Mw | 153.82 |
| Melting point: | −23° C. |
| Boiling point: | 76.7° C. |
| Vapor pressure: | 90 mm at 20° C. |
| | 56 mm at 10° C. |
| | 113 mm at 25° C. |
| | 137 mm at 30° C. |
| Solubility: | 1,160 mg/l at 25° C. |
| | 800 mg/l at 20° C. |
| Saturation concentration: | 754 g/cu m at 20° C. |
| | 1,109 g/cu m at 30° C. |

Unless otherwise specified all other reagents, including bentonite clay, were obtained from the Sigma Chemical Company (Company (St. Louis, Mo.).

Stoichiometric Calculations

Although both copper and iron comprise the reagent to be added to contaminated soil it is understood that copper is primarily a catalyst for the dehalogenation reaction and therefore the net reaction between carbon tetrachloride and iron can be written as follows:

$$CCl_4 + 4H_2O + 4Fe^0 \longrightarrow CH_4 + 4Cl^- + 4OH^- + 4Fe^{+2} \quad (4)$$

Using the above equation it is possible to calculate that the reaction will require 1.45 grams of iron for each gram of carbon tetrachloride to be degraded. Since it is preferred that a molar excess of reagent be used all of the following examples used in excess of 1.45 grams of iron for each grain of carbon tetrachloride.

Determining Soil Absorption for Carbon Tetrachloride

The carbon tetrachloride used for the test had to be detectable in order to produce useful results. The concentration used had to exceed any irreversible absorption of carbon tetrachloride by the soil. The soil's absorption capacity was determined as follows:

1 g portion of soil was accurately weighed into a 4 mL glass vial with a Teflon lined septum seal. A second vial of soil was prepared as a blank.

10 μL (0.01 mL) of carbon tetrachloride were added to the first vial. The 30 vials were sealed and shaken to mix. The concentration of carbon tetrachloride added to the soil was:

(1.594 g/mL×0.01 niL×10⁶ μg/g)/1g=15,940 μg/g (ppm)=1.594%

The soil was allowed to equilibrate overnight and then analyzed for carbon tetrachloride. The concentration found was 1128 μg/g.

The absorption capacity was calculated as the concentration added minus the concentration found in the analysis, i.e., 15,940 μg/g−1128=14,842 ppm and was rounded to 15,000 to reflect the relative accuracy of the analysis.

On the basis of the above calculations the concentration selected for testing was set at the absorption capacity plus at least 10,000 ppm (1%). For the sake of experimental convenience, this figure was increased to 20 μL of carbon tetrachloride per gram of soil, or 31,880 ppm.

pH Determinations

Because soil is known to have a high buffering capacity a test was run to evaluate the effect of adding a dilute acid solution to the soil. Soil was to remove particles larger than ⅛ inch in diameter and subjected to sulfuric acid treatment as follows:

One gram portions of screened soil were weighed into two 8 niL vials.

The soil in the first vial was slurried with I mL of 0.5 N H2SO4-

The soil in the second vial was slurried with I mL of deionized water.

The pH of both vials was checked using Hydrion paper (Baxter Scientific, McGraw Park Ill.). The following data show the pH changes over time.

| Time (Hours) | pH of Soil/Acid Slurry | pH of Soil/Water Slurry |
|---|---|---|
| 0 | 4 | 7 |
| 1 | 5 | 7 |
| 18 | 6–7 | 7 |

Example I

Degradation of Carbon Tetrachloride in Soil Samples With an Iron/Copper Metallic Couple Fe/Cu powder was prepared by dissolving 1.72 g anhydrous cupric chloride (from Aldrich Chemical Co., Milwaukee Wis.) in 382 mL water and adding 510 g 325 mesh (128/cm) iron powder (also from Aldrich Chemical Co.). The slurry container was placed on a roller for one hour. The slurry was filtered, washed three times with 500 mL water, once with acetone, and dried in a vacuum oven at 35° C. overnight. The filter cake was ground in a mortar and pestle and analyzed for 0.17% Cu and 97.6% Fe.

Example 1 demonstrates the degradation of carbon tetrachloride in soil to chloroform in the presence of the metallic couple of iron and copper. Tests were conducted in sealed vials as follows:

One gram portions of screened soil were weighed into twenty-one 8 mL vials. The vials were sealed with hole caps and Tefion-lined septa.

The soil in each vial was spiked through the septum with 20 μL of carbon tetrachloride and allowed to equilibrate overnight.

The vials were divided into three groups of seven vials each. The first group received 0.05 g of iron/copper powder. The second group received 0.05 g of iron. The third group received no metal addition and was used as control samples.

A 1 mL portion of 0.5 N sulfuric acid was added to each of the 21 vials.

The vials were shaken until no soil clumps remained either loose in the vials or stuck to the bottoms or sides. The vials were placed in a plastic box attached to a rotating agitator which provided continuous gentle mixing throughout the first 8 hours of treatment.

Samples from each group were analyzed at 0.5, 2, 4, 6 and 8 hours after the addition of the acid. Two vials from each group were held for analysis at one week and two weeks after the start of treatment.

The entire contents of each vial in the test runs were analyzed as a single sample. Extraction of each sample began as soon as its reaction time was completed. The samples were analyzed for volatile organic compounds according to EPA Method 8260, (USEPA SW 846, Method No. 8260, *Gas Chromatography/Mass Spectrometry for*

Volatile Organics: Capillary Column Technique, Revision 0, December 1987, Purge and Trap Cleanup, followed by GC/MS analysis). Using this method any purgeable product with a molecular weight greater than 50 Daltons was detected, assuming the appropriate concentration. The chromatograms were evaluated specifically for carbon tetrachloride, chloroform, methylene chloride, and chloromethane. Of those four compounds, only carbon tetrachloride and small quantities of chloroform were found. No other compounds were detected.

The analytical results, expressed in $\mu$g/g, are presented below in Tables 2 and 3.

TABLE 2

Analytical Results for Carbon Tetrachloride $\mu$g/g

| Time (Hrs.) | Control | Iron | Fe/Cu |
|---|---|---|---|
| 0.5 | 3579 | 960 | 2407 |
| 2 | 316 | 208 | 865 |
| 4 | 2652 | 1230 | 451 |
| 6 | 252 | 516 | 862 |
| 8 | 3041 | 906 | 438 |

TABLE 3

Analytical Results for Chloroform $\mu$g/g

| Time (Hrs.) | Control | Iron | Fe/Cu |
|---|---|---|---|
| 0.5 | 27 | 44 | 80 |
| 2 | 3 | 12 | 74 |
| 4 | ND | 274 | 116 |
| 6 | 2 | 225 | 324 |
| 8 | 106 | 494 | 61 |

As can been seen from the CCl4 data, the average concentration detected was 1968 $\mu$g/g, 6.17% of the amount originally added, in the control. From the data it was determined that approximately 15,000 $\mu$g of carbon tetrachloride added 5 to the samples would be irreversibly absorbed. Additionally, substantial and variable losses of the volatile carbon tetrachloride, e.g., evaporative losses through vial septa, occur.

As can be seen from the cblorofonn data, iron/copper couple generates a small concentration of chloroforin and then destroys it. Iron alone generated more chloriforin (than the iron/copper), and showed no sign of destroying it during the hours of reaction.

The results of the one week samples on a variety of chlorinated organics as shown in Table 4:

TABLE 4

Results of the 1 Week Samples

| Compound | Control $\mu$/g | Control % | Fe $\mu$g/g | Fe % | Fe/Cu $\mu$g/g | Fe/Cu % |
|---|---|---|---|---|---|---|
| Chloromethane | ND | NA | BQL | NA | ND | ND |
| Methylene Chrloride | ND | NA | 469 | 0.81 | BQL | NA |
| Chloroform | 346 | 0.84 | 1255 | 3.06 | BQL | NA |

TABLE 4-continued

Results of the 1 Week Samples

| Compound | Control $\mu$/g | Control % | Fe $\mu$g/g | Fe % | Fe/Cu $\mu$g/g | Fe/Cu % |
|---|---|---|---|---|---|---|
| Carbon Tetrachloride | 2025 | 6.35 | 723 | 2.27 | ND | NA |

"ND" indicates that there was no peak for that compound in the sample. "NA" indicates not applicable.

"BQL" indicates that there was a small peak, but the calculated result was below the quantitation limit for the analysis. The quantitation limit for all of these compounds was 15 $\mu$g/g. The percentages are calculated by the equation:

$$\text{Percent} = 100 \times \mu g/g \times \text{mol. wt. of compound/Mol. wt Of } CCl_4 \times 31880 \, \mu g/g$$

The figure "31880 "$\mu$g/g" is the amount of carbon tetrachloride added to the one gram samples at the beginning of the test.

Example 2

Degradation of Halogenated Organics Using a Mixture of a Stabilizing Reagent and a Degradative Agent Example 2 demonstrates the degradation Of CCl4 using a stabilized degradative reagent comprising bentonite clay and a Fe/Cu metallic couple. The experimental procedure was as follows:

40 ml glass vials were loaded with 17.3 grams Trevino soil and stoichiometrically determined amounts of Fe/Cu powder (0.16% Cu on Aldrich 325 mesh Fe powder) are added to the vial. The stoichiometric amounts of degradative reagent for total dechlorination are given in Table 1. Control samples used no Fe/Cu. After the addition of these reagents the tubes were capped and the solids were mixed together by manual shaking. This action uniformly distributed the metal powder/degradative reagent throughout the soil matrix.

After mixing the vial was reopened, and water added based at 35% by dry soil weight (6.1 g). Next the vial was carefully sealed and the contents carefully and vigorously shaken to wet all the solids.

A predetermined calculated amount of CC $1_4$ was carefully injected through the vial septum via a syringe and the vial vigorously shaken to distribute the $CCl_4$. After shaking the vials were set aside in a carefully monitored Constant Temperature Bath (CTB) for a predetermined amount of time. Reaction times ranged between 0 and 136 hours and temperatures between 15 and 37° C.

The reaction was hafted by removing the vials from the CTB and immediately injecting UPLC Grade methanol through the septum to act as an extractant. This quantity of methanol was recorded, and the vials were shaken to distribute the methanol extractant through the soil matrix.

The mixtures settled with the Fe to the bottom of each vial, isolating the reactants. All samples were stored/chilled at 4° C. until subjected to GC analysis with a 4 $\mu$l sampling of the liquid (supernatant) per injection. Data showing degradation Of CCl4 by Fe/Cu metallic couple are shown in Table 5.

The data in Table 5 are sorted by reaction temperature, reaction time, and stochiometric ratio of iron added.

TABLE 5

| Sample | Reagent | Stoich Ratio | Temp °C. | Reaction Tm (Hrs) | % Bento. | Starting CCl$_4$ Conc. Wt % | % CCl$_4$ Remaining |
|---|---|---|---|---|---|---|---|
| 3B | Fe/Cu | 0 | 15 | 0 | 0 | 0.5 | 57.5 |
| 19B | Fe/Cu | 0 | 15 | 0 | 0 | 2 | 79.5 |
| B3B | Fe/Cu | 0 | 15 | 0 | 5 | 0.5 | 61.3 |
| B19B | Fe/Cu | 0 | 15 | 0 | 5 | 2 | 84.7 |
| −19-12B | Fe/Cu | 3.45 | 15 | 0 | 0 | 2 | 58.0 |
| −18-B1B | Fe/Cu | 3.45 | 15 | 0 | 5 | 2 | 53.0 |
| −19-5A | Fe/Cu | 13.78 | 15 | 0 | 0 | 0.5 | 58.0 |
| −18-B5A | Fe/Cu | 13.78 | 15 | 0 | 5 | 0.5 | 54.0 |
| 26C | Fe/Cu | 1.72 | 15 | 48 | 0 | 2 | 0.6 |
| B26C | Fe/Cu | 1.72 | 15 | 48 | 5 | 2 | 4.9 |
| 10C | Fe/Cu | 6.89 | 15 | 48 | 0 | 0.5 | 1.2 |
| B10C | Fe/Cu | 6.89 | 15 | 48 | 5 | 0.5 | 0.0 |
| −19-14B | Fe/Cu | 0 | 15 | 96 | 0 | 2 | 83.0 |
| −19-7A | Fe/Cu | 0 | 15 | 96 | 0 | 0.5 | 66.0 |
| −18-B14B | Fe/Cu | 0 | 15 | 96 | 5 | 2 | 91.5 |
| −18-B7A | Fe/Cu | 0 | 15 | 96 | 5 | 0.5 | 92.0 |
| 17B | Fe/Cu | 3.45 | 15 | 96 | 0 | 2 | 0.0 |
| B17B | Fe/Cu | 3.45 | 15 | 96 | 5 | 2 | 0.0 |
| 1B | Fe/Cu | 13.78 | 15 | 96 | 0 | 0.5 | 0.0 |
| B1B | Fe/Cu | 13.78 | 15 | 96 | 5 | 0.5 | 0.0 |
| 30C | Fe/Cu | 1.72 | 25 | 0 | 0 | 2 | 63.0 |
| B30C | Fe/Cu | 1.72 | 25 | 0 | 5 | 2 | 87.7 |
| 14C | Fe/Cu | 6.89 | 25 | 0 | 0 | 0.5 | 10.4 |
| B14C | Fe/Cu | 6.89 | 25 | 0 | 5 | 0.5 | 11.6 |
| 25C | Fe/Cu | 0 | 25 | 48 | 0 | 2 | 44.2 |
| 9C | Fe/Cu | 0 | 25 | 48 | 0 | 0.5 | 7.0 |
| B9C | Fe/Cu | 0 | 25 | 48 | 5 | 0.5 | 0.0 |
| B25C | Fe/Cu | 0 | 25 | 48 | 5 | 2 | 38.2 |
| 32C | Fe/Cu | 1.72 | 25 | 48 | 0 | 2 | 0.9 |
| 29C | Fe/Cu | 1.72 | 25 | 48 | 0 | 2 | 0.0 |
| −19-11B | Fe/Cu | 1.72 | 25 | 48 | 0 | 2 | 38.5 |
| −19-13B | Fe/Cu | 1.72 | 25 | 48 | 0 | 2 | 55.5 |
| −19-9B | Fe/Cu | 1.72 | 25 | 48 | 0 | 2 | 25.5 |
| 20B | Fe/Cu | 1.72 | 25 | 48 | 0 | 2 | 0.0 |
| 18B | Fe/Cu | 1.72 | 25 | 48 | 0 | 2 | 0.3 |
| 22B | Fe/Cu | 1.72 | 25 | 48 | 0 | 2 | 1.5 |
| 27C | Fe/Cu | 1.72 | 25 | 48 | 0 | 2 | 5.5 |
| B27C | Fe/Cu | 1.72 | 25 | 48 | 5 | 2 | 0.0 |
| B18B | Fe/Cu | 1.72 | 25 | 48 | 5 | 2 | 7.8 |
| B22B | Fe/Cu | 1.72 | 25 | 48 | 5 | 2 | 0.0 |
| B20B | Fe/Cu | 1.72 | 25 | 48 | 5 | 2 | 0.0 |
| −18-B13B | Fe/Cu | 1.72 | 25 | 48 | 5 | 2 | 31.5 |
| −18-B9B | Fe/Cu | 1.72 | 25 | 48 | 5 | 2 | 16.5 |
| −18-B11B | Fe/Cu | 1.72 | 25 | 48 | 5 | 2 | 31.0 |
| B32C | Fe/Cu | 1.72 | 25 | 48 | 5 | 2 | 0.0 |
| B29C | Fe/Cu | 1.72 | 25 | 48 | 5 | 2 | 0.0 |
| 31C | Fe/Cu | 3.45 | 25 | 48 | 0 | 2 | 0.0 |
| B31C | Fe/Cu | 3.45 | 25 | 48 | 5 | 2 | 0.0 |
| 2B | Fe/Cu | 6.89 | 25 | 48 | 0 | 0.5 | 0.0 |
| 4B | Fe/Cu | 6.89 | 25 | 48 | 0 | 0.5 | 0.0 |
| −19-6A | Fe/Cu | 6.89 | 25 | 48 | 0. | 0.5 | 8.0 |
| 16C | Fe/Cu | 6.89 | 25 | 48 | 0 | 0.5 | 0.0 |
| 13C | Fe/Cu | 6.89 | 25 | 48 | 0 | 0.5 | 0.0 |
| B16C | Fe/Cu | 6.89 | 25 | 48 | 5 | 0.5 | 0.0 |
| B11C | Fe/Cu | 6.89 | 25 | 48 | 5 | 0.5 | 0.0 |
| 15C | Fe/Cu | 13.78 | 25 | 48 | 0 | 0.5 | 0.0 |
| B15C | Fe/Cu | 13.78 | 25 | 48 | 5 | 0.5 | 0.0 |
| 24C | Fe/Cu | 1.72 | 25 | 96 | 0 | 2 | 0.0 |
| B24C | Fe/Cu | 1.72 | 25 | 96 | 5 | 2 | 0.0 |
| 8C | Fe/Cu | 6.89 | 25 | 96 | 0 | 0.5 | 0.0 |
| B8C | Fe/Cu | 6.89 | 25 | 96 | 5 | 0.5 | 0.0 |
| −19-1A | Fe/Cu | 0 | 37 | 0 | 0 | 0.5 | 92.0 |
| −19-8B | Fe/Cu | 0 | 37 | 0 | 0 | 2 | 88.5 |
| −18-B1A | Fe/Cu | 0 | 37 | 0 | 5 | 0.5 | 88.0 |
| −18-B8B | Fe/Cu | 0 | 37 | 0 | 5 | 2 | 97.5 |
| 23B | Fe/Cu | 3.45 | 37 | 0 | 0 | 2 | 28.6 |
| B23B | Fe/Cu | 3.45 | 37 | 0 | 5 | 2 | 18.1 |
| 7B | Fe/Cu | 13.78 | 37 | 0 | 0 | 0.5 | 54.3 |
| B7B | Fe/Cu | 13.78 | 37 | 0 | 5 | 0.5 | 0.0 |
| 28C | Fe/Cu | 1.72 | 37 | 48 | 0 | 2 | 0.0 |
| B28C | Fe/Cu | 1.73 | 37 | 48 | 5 | 2 | 0.0 |
| 12C | Fe/Cu | 6.89 | 37 | 48 | 0 | 0.5 | 0.0 |
| B12C | Fe/Cu | 6.89 | 37 | 48 | 5 | 0.5 | 0.0 |
| 5B | Fe/Cu | 0 | 37 | 96 | 0 | 0.5 | 16.1 |
| 21B | Fe/Cu | 0 | 37 | 96 | 0 | 2 | 4.6 |
| B21B | Fe/Cu | 0 | 37 | 96 | 5 | 2 | 35.6 |

TABLE 5-continued

| Sample | Reagent | Stoich Ratio | Temp ° C. | Reaction Tm (Hrs) | % Bento. | Starting CCl$_4$ Conc. Wt % | % CCl$_4$ Remaining |
|---|---|---|---|---|---|---|---|
| B5B | Fe/Cu | 0 | 37 | 96 | 5 | 0.5 | 16.2 |
| -19-10B | Fe/Cu | 3.45 | 37 | 96 | 0 | 2 | 0.0 |
| -18-B10B | Fe/Cu | 3.45 | 37 | 96 | 5 | 2 | 0.0 |
| -19-3A | Fe/Cu | 13.78 | 37 | 96 | 0 | 0.5 | 0.0 |
| -18-B3A | Fe/Cu | 13.78 | 37 | 96 | 5 | 0.5 | 1.0 |

While a perfect material balance is difficult to achieve in such tests, a number of conclusions can be drawn from these data.

First, it is evident that the Bentonite clay does not affect the reaction progress. The clay neither aids nor retards the dechlorination reaction. It can be concluded that addition of Bentonite clay to retard groundwater movement will not interfere with the destruction.

Additionally the data shows that the dechlorination reaction is mildly aided by increasing temperature, but sufficient reaction velocity is present at normal ambient temperatures.

Further, it is seen that dechlorination progress is greatly dependent on the stoichiometric ratio of Fe/Cu addition, with the largest residual amounts of CCl4 remaining where no Fe/Cu is included.

Finally, it is seen that complete dechlorination takes place at 0.5% and 2% initial concentrations of CCl$_4$. It can be concluded that high concentrations of DNAPL, typical of spill areas, apparently does not interfere with reaction.

Example 3

Degradation of PCE in Soil Samples With Either Iron or Iron/Palladium Metallic Couple Fe/Pd powder was prepared as the Fe/Cu powder in Example 1 by dissolving 8.93 g anhydrous pafladium(fl) chloride (from Aldrich Chemical Co., Milwaukee Wis.) in 657 mL water and adding 512.0 g 325 mesh (128/cm) iron powder. The slurry was mixed, filtered, washed, dried, ground, and analyzed as in Example 1. The filter cake analyzed for 0.0665% Pd and 99.4% Fe.

Example 3 demonstrates the degradation of PCE in soil in the presence of the metallic couple of iron and Palladium and iron alone. Tests were conducted according to the following protocol:

50 ml centrifuge tubes were loaded with 15.0 g of Trevino soil and stoichiometrically determined arnomts of Fe powder (Aldrich 325 mesh) or Fe/Pd powder (0.05% Pd on Aldrich 325 mesh Fe) were added to each tube. The determined amount for Fe and Fe/Pd was 5.08× the theoretical minimum amount needed for PCE destruction.

Tubes were capped with a septum cap and the solids were shaken and well mixed. Next the caps were removed and water added at 35% by dry soil weight (5.25 g). The tubes were carefully sealed and vigorously shaken to wet the contents and then 0.75 g of PCE was injected into each tube via a syringe. After injection the tubes were again vigorously shaken.

After shaking the tubes were set aside in the CTB for a predetermined amount of time ranging from 0 hr. to 672 hr.

The reaction was stopped by removing the tubes from the CTB and injecting through the septum a measured amount of HPLC grade methanol as extractant. Next the tubes were vigorously shaken and set in an automated tumbler rotating at 30 rpm for 1 hour. Tubes were removed from the tumbler and centrifuged at 4000 rpm for 5 minutes. Each tube was stored/chilled at 4° C. until GC analysis. All GC analysis used 4 ul of supernatant per injection. Data showing the GC analysis of the degradation of PCE is given in Table 6.

TABLE 6

GC analysis of PCE subjected to Fe and Fe/Pd degradative reagent

| Sample | Reagent | Stoich Ratio | Temp ° C. | Reaction Tm (Hrs) | % PCE Remaining |
|---|---|---|---|---|---|
| 13 | Fe/Pd | 0 | 25 | 672 | 59.70 |
| 14 | Fe/Pd | 0 | 25 | 672 | 75.72 |
| 15 | Fe/Pd | 5.05 | 25 | 0 | 152.07 |
| 16 | Fe/Pd | 5.05 | 25 | 168 | 15.92 |
| 17 | Fe/Pd | 5.05 | 25 | 288 | 0.52 |
| 18 | Fe/Pd | 5.05 | 25 | 384 | 10.38 |
| 19 | Fe/Pd | 5.05 | 25 | 672 | 0.02 |
| 20 | Fe/Pd | 5.05 | 25 | 0 | 145.43 |
| 21 | Fe/Pd | 5.05 | 25 | 168 | 32.58 |
| 22 | Fe/Pd | 5.05 | 25 | 288 | 3.69 |
| 23 | Fe/Pd | 5.05 | 25 | 384 | 1.88 |
| 24 | Fe/Pd | 5.05 | 25 | 672 | 0.00 |
| 6 | Fe | 5.05 | 25 | 0 | 133.49 |
| 7 | Fe | 5.05 | 25 | 336 | 74.01 |
| 8 | Fe | 5.05 | 25 | 336 | 4.26 |
| 9 | Fe | 5.05 | 25 | 384 | 7.94 |
| 10 | Fe | 5.05 | 25 | 504 | 2.12 |

While it is difficult to achieve exact material balance in such experiments, it is clear from Table 6 that Fe/Pd has rapidly destroyed the PCE. Essentially complete destruction is obtained within a few hundred hours with 5.05 times the theoretical amount of Fe/Pd. Nearly complete destruction of PCE is obtained with pure Fe with the same reaction time. The no-Fe controls show significant PCE remaining, in spite of apparent experimental losses. The conclusion is that PCE concentrations at least as high as 5% can be easily degraded in a short time by this method, with or without Pd. A concentration of 5% or less represents a typical spatial average for a DNAPL spill region containing residual free phase organic and some pooling.

Example 4

Degradation of TCE in Soil Samples With Either Iron or Iron/Palladium Metallic Couple Example 4 demonstrates the degradation of TCE in soil in the presence of the metallic couple of iron and palladium and iron alone. Tests were conducted according to the protocol described above in Example 3, with 5% TCE being added with other ingredients to 15 grains of soil. Data showing the GC analysis of the degradation of is given in Table 7.

TABLE 7

| Sample | Reagent | Stoich Ratio | Temp ° C. | Reaction Tm (Hrs) | % TCE Remaining |
|---|---|---|---|---|---|
| 1 | Fe/Pd | 0 | 25 | 672 | 72.6 |
| 2 | Fe/Pd | 0 | 25 | 672 | 52.8 |
| 3 | Fe/Pd | 5.08 | 25 | 0 | 116.2 |
| 4 | Fe/Pd | 5.08 | 25 | 168 | 0.0 |
| 5 | Fe/Pd | 5.08 | 25 | 288 | 0.0 |
| 6 | Fe/Pd | 5.08 | 25 | 384 | 0.0 |
| 7 | Fe/Pd | 5.08 | 25 | 672 | 0.0 |
| 9 | Fe/Pd | 5.08 | 25 | 0 | 127.5 |
| 9 | Fe/Pd | 5.08 | 25 | 168 | 0.0 |
| 10 | Fe/Pd | 5.08 | 25 | 288 | 0.0 |
| 11 | Fe/Pd | 5.08 | 25 | 384 | 0.0 |
| 12 | Fe/Pd | 5.08 | 25 | 672 | 0.0 |
| 1 | Fe | 5.08 | 25 | 0 | 101.7 |
| 2 | Fe | 5.08 | 25 | 336 | 6.0 |
| 3 | Fe | 5.08 | 25 | 336 | 0.3 |
| 4 | Fe | 5.08 | 25 | 384 | 8.2 |
| 5 | Fe | 5.08 | 25 | 504 | 1.9 |

It is clear m Table 7 that Fe/Pd has rapidly destroyed the TCE. measurably compi destruction is obtained within a few hundred hours with 5.08 times the theoretical amount of Fe/Pd. Less complete, but still very. significant, destruction of TCE is obtained with pure Fe with the same reaction time. The no-Fe controls show significant TCE remaining, in spite of experimental losses. The conclusion is that TCE concentrations at least as high as 5% can be easily degraded in a short time by this method with or without Pd. A concentration of 5% or less represents a typical spatial average for a DNAPL spill region containing residual free phase organic and some pooling.

Example 5

Degradation of Chlorobenzene in Soil Samples With Iron, Iron/Copper, and Iron/Palladium The procedure of Example 3 was repeated using chlorobenzene instead of tetrachloroethylene, adding 5% chlorobenzene to the 15 g soil and 5.0 times the theoretical amount of iron, iron/copper, or iron palladium. The vials were incubated in a constant temperature bath at 37° C. and analyzed as in Example 3. Analytical results ate shown in Table 8.

TABLE 8

Degradation of Chlorobenzene

| Chlorobenzene Sample | Reagent | Reaction Time (hr.) | % $C_6H_5Cl$ Remaining |
|---|---|---|---|
| 115-1 | Control* | 216 | 76.40 |
| 115-2 | Control* | 480 | 57.36 |
| 115-3 | Fe | 0 | 96.48 |
| 115-4 | Fe | 144 | 68.99 |
| 115-5 | Fe | 216 | 75.48 |
| 115-6 | Fe | 360 | 31.88 |
| 115-7 | Fe | 480 | 39.45 |
| 115-10 | Fe/Cu | 0 | 91.93 |
| 115-11 | Fe/Cu | 114 | 92.93 |
| 115-12 | Fe/Cu | 216 | 66.62 |
| 115-13 | Fe/Cu | 360 | 34.22 |
| 115-14 | Fe/Cu | 480 | 16.07 |
| 115-17 | Fe/Pd | 0 | 92.66 |
| 115-18 | Fe/Pd | 144 | 36.13 |
| 115-19 | Fe/Pd | 216 | 40.22 |
| 115-20 | Fe/Pd | 360 | 6.43 |
| 115-21 | Fe/Pd | 48 | 0.46 |

TABLE 8-continued

Degradation of Chlorobenzene

| Chlorobenzene Sample | Reagant | Reaction Time (hr.) | % $C_6H_5Cl$ Remaining |
|---|---|---|---|

*Controls were the average of 3 vials, and contained no metal. Reductions in the chlorobenzene concentration in the controls are due to evaporative and other losses described above Table 8 shows the progressive degradation of chlorobenzene in soil in the presence of the metsdlic couples of iron and copper, iron and palladium, and iron alone within a few hundred hours. The metal-free controls show significantly greater remaining cidorobenzene concentrations while reflecting the experimental losses. A contaniinmt concentration of 5% or less represents a typical average for a DNAPL spill region containing free phase organic and some pooling.

Example 6

A Degradation of o-Dichlorobenzene in Soil Samples With Iron, Iron/Copper, and Iron/Palladium The procedure of Example 5 was repeated using o-dichlorobenzene instead of chlorobenzene. Again, the vials were incubated in a constant temperature bath at 37° C. and analyzed as in Example 3. The amount of iron present was 5 times the calculated stoictdometric amount required for the reaction. Analytical results are shown in Table 9.

TABLE 9

Degradation of o-Dichlorobenzene

| o-Dichlorobenzene Sample | Reagent | Reaction Time (hr.) | % $C_4H_5C_2$ Remaining |
|---|---|---|---|
| 116-1 | Control* | 216 | 95.08 |
| 116-2 | Control* | 480 | 84.49 |
| 116-3 | Fe | 0 | 89.85 |
| 116-4 | Fe | 144 | 93.17 |
| 116-5 | Fe | 216 | 87.74 |
| 116-6 | Fe | 360 | 89.68 |
| 226-7 | Fe | 480 | 74.44 |
| 116-10 | Fe/Cu | 0 | 87.79 |
| 116-11 | Fe/Cu | 114 | 100.61 |
| 116-12 | Fe/Cu | 216 | 95.94 |
| 116-13 | Fe/Cu | 360 | 84.44 |
| 116-14 | Fe/Cu | 480 | 38.01 |
| 116-17 | Fe/Pd | 0 | 90.90 |
| 116-18 | Fe/Pd | 144 | 81.79 |
| 116-19 | Fe/Pd | 216 | 24.64 |
| 116-20 | Fe/Pd | 360 | 28.64 |

*Controls were the average of 4 vials, and contained no metal. Reductions in the o-dichlorobenzene concentration in the controls are due to evaporative and other losses described above Table 9 shows the progressive degradation of o-dichlorobenzene in soil in the presence of the metallic couples of iron and copper, iron and palladium, and iron alone within a few hundred hours. The metal-free controls show significantly greater remaining o-dichlorobenzene concentrations while reflecting the experimental evaporative losses. A containinant concentration of 5% or less represents a typical average for a DNAPL spill region containing free phase organic and some pooling.

Example 7

Degradation of Tetrachloroethylene by Ferrous Iron and Polysulfide at High pH

Samples were prepared in triplicate in 25-mi glass vials equipped with lead foil septa for sealing. Each vial contained a solution volume of 12 ml and variously ferrous iron (10.8 g/L as Fe, added as ferrous sulfate), Portland cement (100 g/L), sodium polysulfide (8.7 g/L as S), and calcium hydroxide (18.5 g/L) as shown below. The sodium polysulfide was prepared by mixing 0.0965 mol sodium sulfide with 0.193 mole elemental sulfur (1:2 ratio) in a saturated calcium hydroxide solution.

The reaction was initiated by the addition of 40 mg/L tetrachloroethylene (PCE perchloroethylene) into each vial. The charged vials were placed in plastic holders, wrapped in aluminum foil to prevent light-catalyzed reactions, and promptly placed in an incubator shaker and incubated at 40° C. with an orbital shaking speed of 170 rpm for 10 days. After incubation, the remaining tetrachloroethylene in the vials was extracted with 6 ml hexane containing toluene as an internal standard and analyzed by gas chromatography. Analytical results are shown in Table 10.

TABLE 10

Tetrachloroethylene Degradation Results

| System | 10-day CC14 Conc. | Apparent Decay Coeff.** (Day$^{-1}$) | Adjusted Decay Coeff.** (Day$^{-1}$) | Adjusted Half-Life (Days) |
|---|---|---|---|---|
| Ca(OH)$_2$ buffer (control) | 28.4 | 0.034 | — | — |
| Ferrous sulfate | <0.066* | >0.64 | >0.61 | <1.1 |
| Portland cement + ferrous sulfate | <0.066* | >0.64 | >0.61 | <1.1 |
| Na polysulfide | 9.58 | 0.14 | 0.11 | 6.3 |
| Portland cement + Na polysulfide | 13.1 | 0.11 | 0.08 | 8.7 |

*Below detection limit of 0.066 mg/L.
*The apparent first order decay coefficient was calculated according to the equation: $k = -\ln(C/Co)/t$ where Co and C denote the concentration initially (40 mg/L) and after 10 days, respectively, and t is reaction time (IO days). Thus the apparent value includes all losses, e.g., evaporative losses through the septa. An adjustment for such losses can be made by recalculating the decay rate according to: $k' = -\ln(C/C')/t$ where C and t are as previously described and C' is the observed I 0-day concentration in the calcium hydroxide control vial. The adjusted half-life is then calculated from: $t1/2 = \ln 2/k'$ It should be noted that, for the vials in which the remaining tetrachloroethylene concentration was below the detection limit, the adjusted decay coefficients represent minimum values assuming the residual concentration was at the detection threshold. Similarly, the corresponding half-lives represent maximum values.

The results in Table 10 indicate both ferrous iron and polysulfides are effective in degrading tetrachloroethylene. The slightly lessened effect of polysulfide in the presence of Portland cement may be due to oxidized impurities in the cement, e.g., ferric iron, competing for the polysulfide.

What is claimed is:

1. A process for the dissipation of a contamination plume that is downstream in an aquifer from a contamination source, comprising the steps of
   (a) diverting low of groundwater around soil in which the contamination source is located by reducing the permeability of the soil at the contamination source to groundwater flow, and
   (b) admixing a degradative agent with a contaminant in the contamination source to degrade the contaminant, wherein the contamination plume is dissipated.

2. A process according to claim 1 wherein the degradative agent comprises a reductive metal.

3. A process according to claim 2 wherein the reductive metal comprises one or more members of the group consisting of iron, zinc, aluminum, cadmium and magnesium.

4. A process according to claim 2 wherein the reductive metal is iron.

5. A process according to claim 1 wherein the degradative agent comprises a metallic couple.

6. A process according to claim 5 wherein the metallic couple comprises a zero valent metal and a metallic catalyst.

7. A process according to claim 6 wherein the zero valent metal comprises one or more members of the group consisting of iron, zinc, aluminum, cadmium and magnesium.

8. A process according to claim 6 wherein the zero valent metal is iron.

9. A process according to claim 6 wherein the metallic catalyst comprises copper or palladium, or a mixture thereof.

10. A process according to claim 6 wherein the metallic catalyst is copper.

11. A process according to claim 5 wherein the metallic couple is iron and copper.

12. A process according to claim 5 wherein the metallic couple comprises about 90 to about 95 percent by weight zero valent metal, and about 5 to about 10 percent by weight metallic catalyst.

13. A process according to claim 5 wherein the metallic couple comprises about 98 to about 99.9 percent by weight iron, and about 0.1 to about 2 percent by weight copper.

14. A process according to claim 5 wherein the metallic couple is admixed with the contamination source at a molar excess with respect to the concentration of the contaminant.

15. A process according to claim 5 wherein the metallic couple is admixed with the contamination source in an amount of about 1 to about 10 percent by weight.

16. A process according to claim 1 wherein the degradative agent comprises metal on carbon.

17. A process according to claim 16 wherein the metal on carbon is selected from the group consisting of Pt/C, Pd/C and Rh/C.

18. A process according to claim 11 wherein the degradative agent comprises a member of the group consisting of ferrous iron, a sulfide, and an alkaline reagent.

19. A process according to claim 18 wherein the degradative agent is admixed with the contamination source at a molar excess with respect to the concentration of the contaminant.

20. A process according to claim 11 wherein the degradative agent comprises ferrous iron.

21. A process according to claim 11 wherein the degradative agent comprises ferrous iron and an alkaline buffer.

22. A process according to claim 1 wherein the degradative agent is ferrous sulfate and calcium hydroxide, or ferrous sulfate and Portland cement.

23. A process according to claim 1 wherein the degradative agent comprises a sulfide.

24. A process according to claim 1 wherein the degradative agent comprises an alkali metal sulfide.

25. A process according to claim 1 wherein the degradative agent is sodium polysulfide.

26. A process according to claim 1 wherein the degradative agent comprises an alkaline reagent.

27. A process according to claim 1 wherein the degradative agent comprises an alkali or alkaline earth metal carbonate, bicarbonate or hydroxide.

28. A process according to claim 1 wherein the degradative agent is stabilized.

29. A process according to claim 1 wherein the permeability of the soil is reduced by admixing with the soil a stabilizing agent selected from the group consisting of Portland cement, soluble silicates cement, pozzolan lime, pozzolan cement, clay cement, clay, mixtures of iron chloride, fly ash, and a metal solution mixture from which solid phase metal compounds are precipitated.

30. A process according to claim 29 wherein the stabilizing agent is selected from the group consisting of bentonite clay, kaolinite clay and Portland cement.

31. A process according to claim 29 wherein the stabilizing agent is admixed with the soil in an amount of about 1 to about 10 percent by weight.

32. A process according to claim 1 which is conducted at a pH in the range of 2.0 to 10.0.

33. A process according to claim 1 wherein steps (a) and (b) are conducted simultaneously.

34. A process according to claim 1 wherein the contaminant comprises a dense non-aqueous phase liquid.

35. A process according to claim 1 wherein the contaminant comprises a halogented organic solvent.

36. A process according claim 1 wherein the contaminant is one or more members selected from of the group consisting of chloroform, trichloroethylene, tetracholoroethylene, methylene chloride, polychlorinated biphenyls, carbon tetrachloride, and chlorinated benzenes.

* * * * *